United States Patent
Yan et al.

(10) Patent No.: US 8,612,180 B2
(45) Date of Patent: Dec. 17, 2013

(54) CALIBRATION OF RESOURCE ALLOCATION DURING PARALLEL PROCESSING

(75) Inventors: Jianfeng Yan, Shanghai (CN); Wen-Syan Li, Shanghai (CN)

(73) Assignee: SAP AG, Walldorf (DE)

( * ) Notice: Subject to any disclaimer, the term of this patent is extended or adjusted under 35 U.S.C. 154(b) by 748 days.

(21) Appl. No.: 12/717,694

(22) Filed: Mar. 4, 2010

(65) Prior Publication Data

US 2011/0093852 A1    Apr. 21, 2011

(30) Foreign Application Priority Data

Oct. 21, 2009   (CN) .......................... 2009 1 0180738

(51) Int. Cl.
*G06F 9/28* (2006.01)

(52) U.S. Cl.
USPC ............ 702/186; 702/127; 702/182; 712/229

(58) Field of Classification Search
USPC .......................... 702/127, 182, 186; 712/229
See application file for complete search history.

(56) References Cited

U.S. PATENT DOCUMENTS

| 6,341,371 | B1 | 1/2002 | Tandri |
| 2001/0011268 | A1 | 8/2001 | Tsuchida et al. |
| 2004/0015978 | A1* | 1/2004 | Orii ............................. 718/105 |
| 2010/0312762 | A1* | 12/2010 | Yan et al. ...................... 707/716 |

OTHER PUBLICATIONS

Office Action for EP Application No. 10013820.5, mailed Jul. 20, 2012, 5 pages.
Gonzalez-Velez, "Adaptive Structuted Parallelism for Computational Grids", Proceedings of the 12th ACM SIGPLAN Symposium on Principles and Practice of Parallel Programming, Mar. 14-17, 2007, pp. 140-141.

* cited by examiner

*Primary Examiner* — Alexander H Taningco
*Assistant Examiner* — L. Anderson
(74) *Attorney, Agent, or Firm* — Brake Hughes Bellermann LLP

(57) ABSTRACT

A first performance measurement of an executing task may be determined, while the task is executed by a first number of nodes operating in parallel. A second performance measurement of the executing task may be determined, while the task is being executed by a second number of nodes operating in parallel. An overhead factor characterizing a change of a parallelism overhead of executing the task with nodes executing in parallel may then be calculated, relative to a change in a number of the nodes, based on the first performance measurement and the second performance measurement. Then, an optimal number of nodes to operate in parallel to continue executing the task may be determined, based on the overhead factor.

20 Claims, 6 Drawing Sheets

CALIBRATION OF RESOURCE ALLOCATION DURING PARALLEL PROCESSING

CROSS-REFERENCE TO RELATED APPLICATION

This application claims priority under 35 U.S.C. §119 to Chinese Patent Application 200910180738.X, filed Oct. 21, 2009, titled "CALIBRATION OF RESOURCE ALLOCATION DURING PARALLEL PROCESSING," which is incorporated herein by reference in its entirety.

TECHNICAL FIELD

This description relates to resource allocation during parallel processing.

BACKGROUND

Many scenarios in computing realms are known to benefit from parallel processing. In general, such parallel processing may refer to the use of two or more otherwise-separate computational resources to execute a single task or computation, in a simultaneous or overlapping fashion. One example of such parallel processing may occur in the realm of database search/access, where two or more computational resources (e.g., two servers, processors, or cores) are used to execute a single query of a large database, in order to provide a query result more quickly than a single one of the computational resources would be able.

Another of many examples of realms which may benefit from parallel processing is cloud computing. Cloud computing refers generally to providing computing/processing capabilities as a utility, and to fulfilling computing needs of a user(s) on an as-needed basis, including increasing, decreasing, or otherwise changing the user's computational abilities in accordance with the user's demands (and, correspondingly, increasing, decreasing, or otherwise changing an associated cost of providing such computational abilities). For example, a user may use a generic, general-purpose computing device to access computational resources of a provider over a network, so that the provider may exercise control over the computational resources that are provided.

To implement such scenarios, the provider may deploy the necessary hardware and software that is deemed necessary to service the provider's customer base. That is, such a provider will have certain expectations or predictions about a number of users who will be accessing the providers' hardware/software resources, as well as expectations/predictions about the extent to which these users will consume resources (e.g., some users may require tasks which are far more data-intensive than other users). In order to be cost-effective, then, the provider will generally seek to optimize available resources, including using minimal resources necessary to meet current computing demands of the provider's customer base.

Parallel processing allows the provider in such a scenario to pursue such optimization by, e.g., allocating resources executing in parallel to a particular user and/or for a particular computational task. In this way, a particular user may obtain, for a desired period of time, the effect of accessing a large amount of computational resources (e.g., fast processing speeds), without having to incur all the costs associated with the actual purchase, installation, and management of associated hardware and software.

Implementation of such parallel processing, however, is difficult to accomplish in an efficient or optimal manner. For example, there may be overhead costs associated with splitting/assigning multiple tasks (of multiple users) to the multiple available processing resources, as well as costs associated with re-joining or merging the results of the task processing. Depending, e.g., on the nature of the tasks in question, and the extent of the parallelization, the utility of added processing resources may be reduced, and such overhead costs may limit, and may ultimately dominate or overwhelm, the benefits of the parallelization. Such scenarios in which a larger-than-optimal number or amount of processing resources are used may be referred to as over-parallelization. Conversely, the assignment of too few processing resources to a given task/user may occur and may be referred to asunder-parallelization, and may result in unnecessarily slow overall processing times, and a corresponding decrease in user satisfaction.

Further, complexity and unpredictability of a runtime environment of one or more running tasks may exacerbate the difficulties of multi-core parallel query processing. For example, even if an acceptable plan for parallel processing is formulated prior to runtime, it may occur that runtime events occur which reduce the efficacy or desirability of the planned parallelization. Thus, effective implementation of parallel processing is a difficult and non-trivial challenge, and sub-optimal implementation may limit an efficacy of computing resources and a productivity/satisfaction of users.

SUMMARY

According to one general aspect, a system includes instructions recorded on a computer-readable medium. The system may include a sampler configured to determine a first performance measurement of an executing task, while the task is executed by a first number of nodes operating in parallel, and configured to determine a second performance measurement of the executing task, while the task is being executed by a second number of nodes operating in parallel, and a calibrator configured to calculate an overhead factor characterizing a change of a parallelism overhead of executing the task with nodes executing in parallel, relative to a change in a number of the nodes, based on the first performance measurement and the second performance measurement, and configured to determine an optimal number of nodes to operate in parallel to continue executing the task, based on the overhead factor.

Implementations may include one or more of the following features. For example, the task may include a task of a software application, and the first performance measurement and the second performance measurement may include measurements of elapsed times used to process a fixed amount of data of the software application using the first number of nodes and the second number of nodes, respectively.

The sampler may include an adjustment manager configured to determine and execute an adjustment from the first number of nodes to the second number of nodes after the determination of the first performance measurement, including determining a fixed number of nodes and determining whether to increase or decrease the first number of nodes by the fixed number of nodes to obtain the second number of nodes. The adjustment manager may be configured to determine whether to increase or decrease the first number of nodes based on a difference between the first performance measurement and a previous performance measurement.

The calibrator may be configured to determine a first overhead factor based on the first performance measurement and the second performance measurement, receive at least a third performance measurement of the executing task, while the task is being executed by a third number of nodes operating in parallel, determine a second overhead factor using the third performance measurement and at least one other performance measurement, and determine the overhead factor as an average value of the first overhead factor and the second overhead factor.

The calibrator may be configured to calculate the overhead factor as characterizing an overhead function O(n) within a reduction function f(n)=(1/n)+O(n), where n represents a number of nodes and where the reduction function characterizes the change of the parallelism overhead of executing the task with nodes executing in parallel. The overhead function O(n) may be represented as an, and the calibrator may be configured to calculate the overhead factor as including the term $\alpha$ as representing a linear rate of change of the parallelism overhead of executing the task with nodes executing in parallel. The calibrator may be further configured to determine the overhead factor including the term $\alpha$ by comparing the reduction function evaluated with the first and second number of nodes relative to a performance change between the first and second performance, according to an equation $f(N_{second})-f(N_{first})=(P_{second}-P_{first})/T$, where $P_{first}$ and $P_{second}$ represent the first and second performance measurements, respectively, and where T represents a time of execution using a single node.

Determination of the optimal number of nodes may represent an end of a current sampling-then-calibrating operation, and the system may include a calibrating duration controller configured to control a time interval between the current sampling-then-calibrating operation and a subsequent sampling-then-calibrating operation. The calibrating duration controller may be configured to determine the time interval based on a change in the optimal number of nodes of the current sampling-then-calibrating operation and at least one previously-determined optimal number of nodes of at least one previous sampling-then-calibrating operation. The calibrating duration controller may be configured to determine the time interval based on a previous time interval between the current sampling-then-calibrating operation and a previous sampling-then-calibrating operation.

The calibrator may be configured to instruct a resource scheduler to assign the optimal number of nodes for execution of the task therewith.

According to another general aspect, a first performance measurement of an executing task may be determined, while the task is executed by a first number of nodes operating in parallel. A second performance measurement of the executing task may be determined, while the task is being executed by a second number of nodes operating in parallel. An overhead factor characterizing a change of a parallelism overhead of executing the task with nodes executing in parallel may then be calculated, relative to a change in a number of the nodes, based on the first performance measurement and the second performance measurement. Then, an optimal number of nodes to operate in parallel to continue executing the task may be determined, based on the overhead factor. computer-implemented method comprising:

Implementations may include one or more of the following features. For example, determining the first performance measurement may include executing an adjustment from the first number of nodes to the second number of nodes after the determining of the first performance measurement, including determining a fixed number of nodes and determining whether to increase or decrease the first number of nodes by the fixed number of nodes to obtain the second number of nodes. Calculating the overhead factor may include calculating the overhead factor as characterizing an overhead function O(n) within a reduction function f(n)=(1/n)+O(n), where n represents a number of nodes and where the reduction function characterizes the change of the parallelism overhead of executing the task with nodes executing in parallel.

Determining of the optimal number of nodes may be associated with an end of a current sampling-then-calibrating operation. Then, a time interval between the current sampling-then-calibrating operation and a subsequent sampling-then-calibrating operation may be controlled, based on a change in the optimal number of nodes of the current sampling-then-calibrating operation and at least one previously-determined optimal number of nodes of at least one previous sampling-then-calibrating operation, and further based on a previous time interval between the current sampling-then-calibrating operation and a most-recent previous sampling-then-calibrating operation.

According to another general aspect, a computer program product may be tangibly embodied on a computer-readable medium and may include instructions that, when executed, are configured to determine a first performance measurement of an executing task, while the task is executed by a first number of nodes operating in parallel, determine a second performance measurement of the executing task, while the task is being executed by a second number of nodes operating in parallel, calculate an overhead factor characterizing a change of a parallelism overhead of executing the task with nodes executing in parallel, relative to a change in a number of the nodes, based on the first performance measurement and the second performance measurement, and determine an optimal number of nodes to operate in parallel to continue executing the task, based on the overhead factor.

Implementations may include one or more of the following features. For example, the overhead factor may characterize an overhead function O(n) within a reduction function f(n)= (1/n)+O(n), where n represents a number of nodes and where the reduction function characterizes the change of the parallelism overhead of executing the task with nodes executing in parallel. The overhead function O(n) may be represented as an, and the overhead factor may be calculated as including the term $\alpha$ as representing a linear rate of change of the parallelism overhead of executing the task with nodes executing in parallel.

Determining of the optimal number of nodes may be associated with an end of a current sampling-then-calibrating operation, and a time interval between the current sampling-then-calibrating operation and a subsequent sampling-then-calibrating operation may be determined based on an extent to which the optimal number of nodes of the current sampling-then-calibrating operation is different from a previously-determined optimal number of nodes of a previous sampling-then-calibrating operation.

The details of one or more implementations are set forth in the accompanying drawings and the description below. Other features will be apparent from the description and drawings, and from the claims.

DETAILED DESCRIPTION

Figure 1:
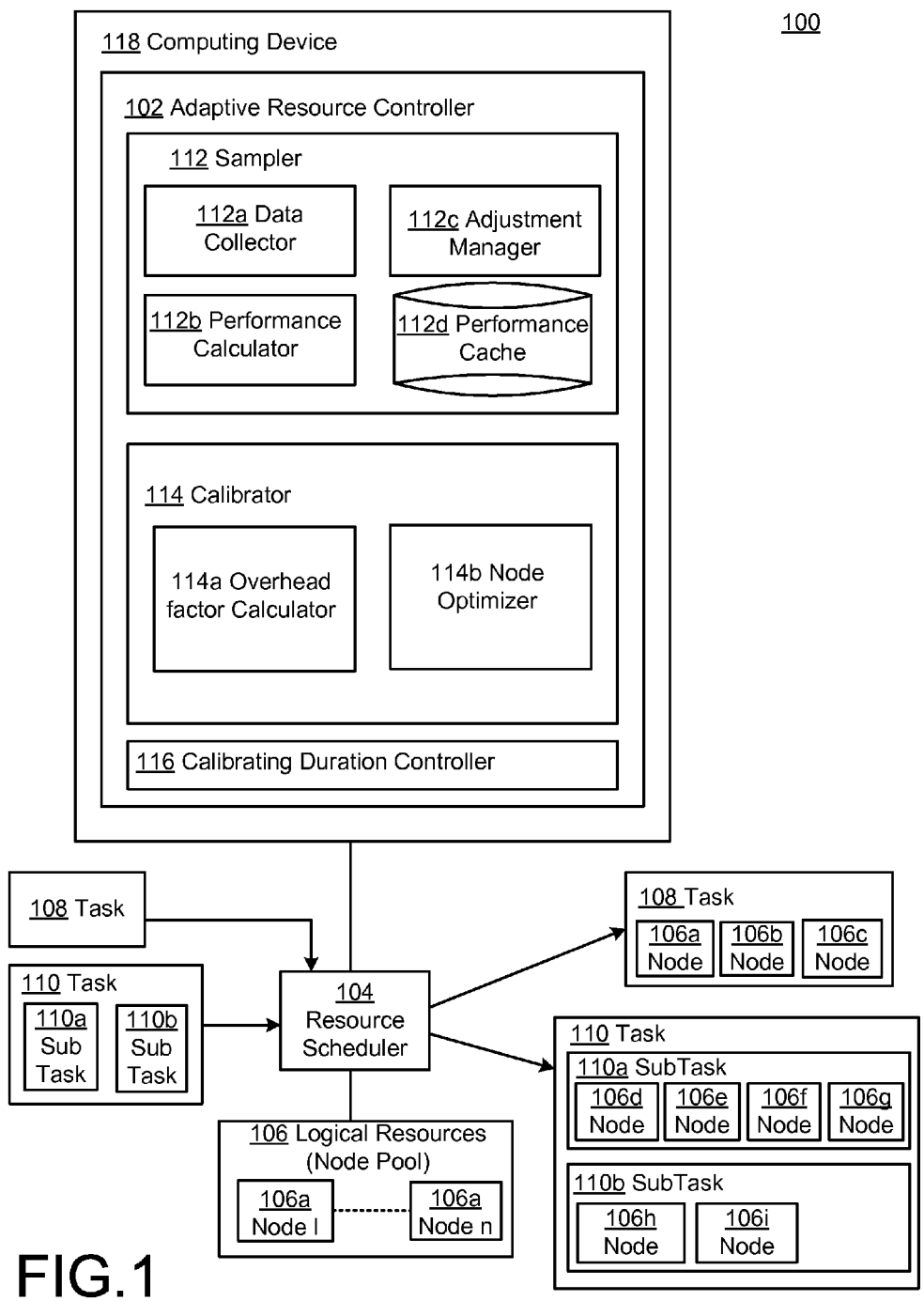
FIG. 1 is a block diagram of a system for performing calibration of resource allocation for parallel processing.

FIG. 1 is a block diagram of a System 100 for performing calibration of resource allocation during parallel processing. In the example of FIG. 1, an Adaptive Resource Controller 102 is configured to provide instruction to a Resource Scheduler 104, to thereby instruct the Resource Scheduler 104 with regard to assignment of Logical Resources 106 within and among a plurality of tasks including a Task 108 and a Task 110. More particularly, the Adaptive Resource Controller 102 may be configured to ensure that appropriate quantities of the Logical Resources 106 are assigned to execution of each of the Tasks 108, 110, so that execution of the Tasks 108, 110 may proceed in an optimized or otherwise desired manner.

In the example of FIG. 1, the Logical Resources 106 may be understood to represent, for example, virtually any discrete and/or independent computing resource(s) which may be configured to operate in parallel with one another in order to execute one or both of the Tasks 108, 110. For example, the Logical Resources 106 may include a plurality or pool of nodes which represent hardware and/or software based servers, individual processors, processing cores, or any other computing element, device, or resource which may be configured to operate in parallel with a corresponding element, device, or resource. For example, the term core(s) should be understood to refer to, or include, any multi-computing platform in which a plurality of processors, central processing units (CPUs), or other processing resources are available, including network/device clusters. In a specific example, as referenced above, parallel query processing is known as an option for improving database performance on existing SMP/CMP (Symmetrical Multi-Processing/Chip-level Multi-Processing) servers, particularly for high performance database systems which are able to process huge volumes of data and complex queries efficiently. Thus, in the present description, it should be appreciated that the Logical Resources 106 represent a unit(s) of processing power within any such environment in which multiple processing options are available. For the sake of simplicity and consistency, all such resources are referred to herein as "nodes" but it will be appreciated that the referenced nodes may in fact represent any one or more of the above examples, or other examples of computing resources which may be configured to execute parallel processing, as would be apparent to one of skill in the art.

Correspondingly, it will be appreciated that the Tasks 108, 110 may represent virtually any application, operation, query, request, computation, or other task(s) which may be split into multiple threads of execution or processing. For example, it may be appreciated from the above discussion that the Tasks 108, 110 may represent queries against a database application, or may represent requests for computing resources to be provided as part of a cloud computing infrastructure. Of course, these examples are non-limiting and many other examples of the Tasks 108, 110 exist. For example, the Tasks 108, 110 may represent requests for a particular computation to be performed, or may represent a request for dynamic assembly and provision of a website, or a request for a particular operation or function of a website (e.g., a completion of a financial transaction using the website in question). Many other examples exist, some of which are provided below in more detail.

In the example of FIG. 1, the Resource Scheduler 104 may be understood to represent, in part, a standard or conventional component which may be used to execute an allocation of nodes within the pool of Logical Resources 106 within and among the Tasks 108, 110. To the extent that such functionality is conventional, it is not described here in detail. However, new or unique functionality of the Resource Scheduler 104 within the specific execution of the System 100 of FIG. 1 may be appreciated to occur, e.g., with respect to interactions with, and instructions from, the Adaptive Resource Controller 102 and/or the pool of nodes of the Logical Resources 106, and therefore may be referenced in more detail in the present description.

In particular, as may be appreciated from the above discussion, it is generally known to use a component such as the Resource Scheduler 104 (or an analogous component, or portions thereof), to allocate a particular number of nodes to execute in parallel to thereby attempt to improve the processing speed or efficiency of a task. However, as also referenced above, it may be difficult to use such conventional components to allocate nodes for parallel processing for the Tasks 108, 110 in an optimal or otherwise desired manner.

For example, it is known in general to assign a designated number of nodes, e.g., 10 nodes, for an execution of the Task 108, prior to a beginning of execution of the Task 108. Such an allocation may be made, e.g., based on available resources and/or based on an estimate of the need of the Task 108. In other examples of known possibilities for resource allocation, resource allocation may occur according to a method in which a maximum number of currently-available resources are assigned to each task, prior to a beginning of execution of the task.

In these and virtually all known techniques for executing parallel processing of tasks, there is a parallelism overhead associated with the parallel processing, which relates at least to a splitting of a particular task into multiple threads of execution, and to a subsequent joining of the tasks into a single result, as the individual threads of execution complete. For example, if the Task 108 is executed with a single node, then a time "T" necessary to perform a particular task or sub-task may be straightforward to calculate or otherwise determine. Assigning a second node to the processing of the Task 108 would in theory double the applied processing power, and therefore reduce the processing Time by a factor of 2. In reality, the above-referenced costs associated with, e.g., splitting the Task 108 into two threads of execution, and subsequent costs associated with rejoining the two threads of execution into a single result, will cause the total processing time to be reduced by less than a factor of two.

More generally, tasks or sub-tasks may be dependent upon one another, so that, e.g., decisions must be made about which tasks/sub-tasks are assigned to which node. Partitioning and subsequent merging of the tasks must generally be tracked and managed in order to ensure a satisfactory result. Further, such splitting/tracking/merging of parallel operations may occur differently depending on a relevant system architecture (e.g., node speed, size and bandwidth of relevant memories, Input/Output speed, whether and how a cache memory is used, and other known factors) and/or depending on a nature of the task and/or processing thereof.

Figure 2A:
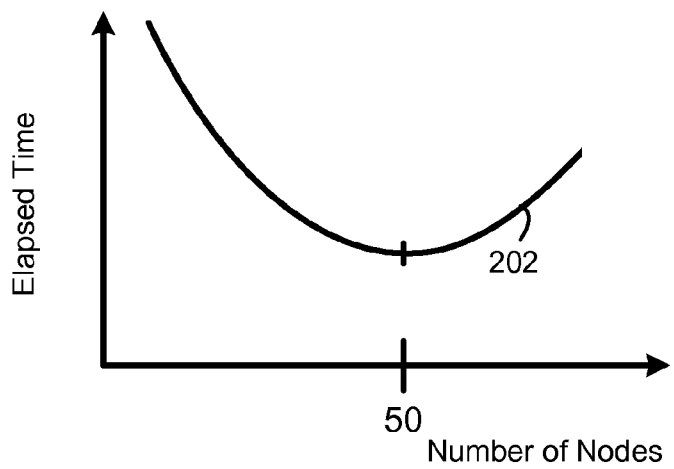
FIG. 2A is a graph illustrating a relationship of a sampling time relative to a corresponding number of nodes.

FIG. 2A illustrates a graphical example of the effects of parallelization, including the effect of associated parallelism overhead costs. As shown in FIG. 2A, an X axis illustrates an increasing number of nodes to be applied in parallel for a processing of a particular task, such as the Task 108, while a Y axis illustrates an elapsed time associated with execution of the particular task (or portion or sub-task thereof). As illustrated by a graph/curve 202, an initial increase of nodes results in a substantial decrease in the total elapsed time for the desired processing of the task. However, as just referenced, each addition of each new node requires additional splitting, processing, and joining of a corresponding new thread of execution, among other possible parallelism overhead costs. As each node is added, this parallelism overhead cost therefore increases, until at some point, the parallelism overhead cost overwhelms the benefit of the parallelization of the task in question. At this point, addition of further nodes to the parallel execution of the task in question will only result in an increase of the elapsed time, i.e., will result in a decreased performance of the execution of the task in question. In the example of FIG. 2A, the minimum of the graph 202 is illustrated at the example of 50 nodes. That is, 50 nodes represent a point at which maximum/optimum parallelization is achieved, prior to a degradation of the performance of the task in question associated with the parallelism overhead cost.

The graph 202 of FIG. 2A may therefore be represented by a reduction function which captures and represents the above-described outcome in which an increase in a number of parallel nodes causes a corresponding decrease in elapsed processing time, and an incremental increase in parallelism overhead cost, which continues with the addition of each new node until if and when the incremental parallelism overhead costs accumulate and eventually overwhelm and remove any added benefit of additional nodes. In example of such a reduction function is shown below in Eq. 1:

$$f(n)=1/n+O(n) \quad \text{Eq. 1}$$

In the reduction function of Eq. 1, it may be appreciated that the reduction function f(n) itself refers to e.g., an elapsed time or other performance measurement of the task in question, such as illustrated along the Y axis of FIG. 2A. In the described examples, the reduction function is expressed/normalized with respect to the time T referenced above as the time necessary for the task to be performed by a single one of the nodes (that is, for n=1, f(1)=1).

Meanwhile, the first term 1/n conceptually represents a reverse-linear function by which elapsed processing time decreases with the addition of each new parallel node. The function O(n) represents the parallelism overhead cost which will generally cause a corresponding increase in the elapsed processing time associated with the addition of each new node past the optimum number of nodes.

It may be appreciated, then, that the overhead function O(n) may be instrumental in characterizing an overall effect of the reduction function of Eq. 1. That is, if the overhead function O(n) increases rapidly with the addition of each new node, then the reduction function for a particular task may reach an optimal number of nodes relatively quickly, i.e., will demonstrate optimal processing with a relatively small number of nodes. In contrast, if the overhead function O(n) increases slowly with the addition of each new node, then a relatively large number of nodes may be applied to the parallel processing of the task in question before an optimal or maximum number of nodes is reached.

Although the general nature and characteristics of the reduction function of Eq. 1 may be straightforward to appreciate based on the above description, it may also be appreciated that the overhead function O(n) is dependent upon many different factors, and therefore may be difficult to represent or characterize in any meaningful or useful way. For example, the overhead function O(n) may depend on the nature or type of task being executed, or may depend on a nature or characteristic of each node of Node Pool 106. Moreover, the overhead function O(n) may change dynamically during execution of a particular task. For example, in the example of FIG. 1, the Task 110 is illustrated as including a first sub-task 110A and a second sub-task 110B. In this case, the first sub-task 110A may be associated with a first overhead function, while the second sub-task 110B may be associated with a second overhead function, where the first and second overhead functions may be drastically different from one another. Examples of such different sub-tasks are provided in more detail below, however, it may be appreciated that such differences in execution characteristics of various tasks or sub-tasks result in further difficulties in characterizing the overhead function O(n) for each sub-task, or for the task as a whole.

In the example of System 100 in FIG. 1, the Adaptive Resource Controller 102 may be configured to assign an optimal or otherwise desired number of nodes of the Node Pool 106 to the Task 108, 110, without requiring prior knowledge or characterization of associated overhead functions, or other knowledge of parallelism overhead costs. Moreover, the Adaptive Resource Controller 102 may be configured to make such resource allocations dynamically during a runtime or execution of each of the Tasks 108, 110, and is therefore capable of accounting for different resource needs of each of the Tasks 108, 110 during an execution thereof (for example, such as during a change from the first sub-task 110A to the second sub-task 110B during execution of the Task 110).

The Adaptive Resource Controller 102 and the System 100 as a whole therefore provide improvements and advantages over corresponding conventional components or uses thereof, such as described in the examples above. For example, a conventional use of the components such as the Resource Scheduler 104 to assign nodes of the Logical Resources 106 to Task 108 may include, as described above, assignment of a fixed or estimated number of nodes to the task, prior to commencement of the execution of the Task 108. As may be appreciated from the above discussion, however, such an estimate may be difficult to determine with any level of accuracy. Moreover, it is possible or likely that any such estimate, even if initially accurate, will not remain accurate during an execution of an entirety of a particular task (and sub-tasks thereof). Moreover, it will be appreciated from the above discussion that assignment of an actual number of available nodes to any particular task, prior to execution of use of the task, may be suboptimal, e.g., may over-parallelize or under-parallelize the task, in accordance with the reduction function of Eq. 1 above.

In contrast, the Adaptive Resource Controller 102 of FIG. 1 is configured to dynamically and collectively assign the nodes of the Logical Resources 106 to each of the Tasks 108, 110, during execution of each task. More particularly, the Adaptive Resource Controller 102 may include a Sampler 112 which is configured to monitor a performance of a particular task, such as the Task 108, using a current number of assigned nodes, and is further configured to alter or adjust the current number of nodes, and to thereafter continue monitoring the performance of the Task 108 using the adjusted number of nodes.

Using this performance information, the Adaptive Resource Controller 102 may implement a Calibrator 114 which receives the samples of performance information from the Sampler 112, and determines a characterization of a current nature of the relevant overhead function O(n). Then, based on this characterization of the relevant or current overhead function O(n), the Calibrator 114 may determine (e.g., an approximation of) a current optimal number of nodes.

Consequentially, the Calibrator 114 may instruct the Resource Scheduler 104 to implement an assignment of the determined optimized number of nodes to the task in question e.g., the Task 108. In this way, the number of nodes assigned to the Task 108 may be optimized or nearly optimized based on current conditions of the Task 108 and the nodes of the Logical Resources 106, without particular prior knowledge of the task or other system information, i.e., without prior knowledge of the overhead function O(n).

Thereafter, the Task 108 may proceed with parallel execution thereof by the determined optimal number of nodes of the Logical Resources 106. As may be appreciated from the above discussion, however, it may occur over time that the previously determined optimal number of nodes is no longer, in fact, optimal. For example, as described, the nature of the Task 108 (or sub-task thereof) may change over time, so that a corresponding overhead function and associated optimal number of nodes also may change.

Consequently, the Adaptive Resource Controller 102 may be configured to repeat the above described operations of the Sampler 112 and the Calibrator 114. That is, the Sampler 112 may again measure a current performance of the Task 108 using the previously determined optimal number of nodes, and may thereafter adjust the current number of nodes to a new or third number of nodes, and may determine a performance of the Task 108 under these conditions. Using this information, the Calibrator 114 may obtain a more current or updated characterization of the overhead function O(n), and, based on this characterization, may determine a new or updated optimal number of nodes. Thereafter, the Calibrator 114 may again instruct the Resource Scheduler 104 to assign the newly-determined optimal number of nodes to the execution of the Task 108.

Thus, the Adaptive Resource Controller 102 may be configured to execute, periodically or at other time intervals, a proactive or preemptive adjustment of a number of currently-assigned nodes executing a particular task, such as the Task 108. These proactive or preemptive adjustments of the assigned nodes provide information characterizing a current overhead function O(n), which in turn allows the Adaptive Resource Controller 102 to update a current optimal number of nodes, each time the proactive or preemptive node adjustment (and associated calculations) occur. Thus, the Adaptive Resource Controller 102 may be said to calibrate the allocation of the Logical Resources 106 with respect to the Tasks 108, 110 during parallel processing thereof, and to perform such calibrations periodically or at other time intervals.

It may be appreciated that as each such calibration occurs, an associated calibration cost may be incurred. Such a calibration cost may be most easily observed in a situation in which the Task 108 currently executes with an optimal number of nodes, and in which the optimal number of nodes does not change in between the time intervals of calibrations. In such a case, an attempted calibration, although unknown to an operator of System 100, will be unnecessary, since an optimal number of nodes already is being used. In such a circumstance, the Adaptive Resource Controller 102 will operate as described above to provide pre-emptive adjustments to the optimal number of nodes, and to perform associated calculations. Such adjustments and calculations are potentially unnecessary, and therefore potentially detrimental to an overall processing time of the Task 108, and therefore represent a cost of calibrating the allocation of the resources of the Node Pool 106 to execution of the Task 108. More generally, it will be appreciated that virtually any operation of the Sampler 112 and the Calibrator 114 of the Adaptive Resource Controller 102 may incur at least some minimal processing (or other) cost which may be detrimental to an overall processing time of the Task 108.

In order to minimize an effect of such calibration cost, the Adaptive Resource Controller 102 may include a Calibrating Duration Controller 116. As described in more detail below, the Calibrating Duration Controller 116 may be configured to adjust a length of time intervals in which the Adaptive Resource Controller 102 executes calibration functions associated with the Sampler 112 and the Calibrator 114.

More particularly, the Calibrating Duration Controller 116 may compare an effect of an outcome of a current calibration to one or more previous calibrations. If the result of such comparison indicates that little or no change in the optimal number of nodes was, in fact, necessary, then the Calibrating Duration Controller 116 may increase the time interval until a next calibration operation of the Adaptive Resource Controller 102. Conversely, if the Calibrating Duration Controller 116 determines that a relatively large change in an optimal number of nodes occurred between one or more previous calibrations to the current calibration, then the Calibrating Duration Controller 116 may decrease a time interval until the next calibration operation of the Adaptive Resource Controller 102 occurs. By dynamically adjusting the time interval between calibrations in this manner, the Calibrating Duration Controller 116 may operate to minimize calibration cost associated with the Adaptive Resource Controller 102.

FIG. 1 provides more detailed examples of specific implementations of the Sampler 112 and the Calibrator 114 of the Adaptive Resource Controller 102. In particular, the Sampler 112 is illustrated as including subcomponents related to determining performance data of an executing task, such as the Task 108, and to altering or adjusting a number of nodes used to execute the task, so as to collect performance data while the task is being executed using the new or adjusted number of nodes. Thus, the Sampler 112 is illustrated as including a Data Collector 112A, a Performance Calculator 112B, an Adjustment Manager 112C, and a performance Cache 112D.

As may be generally appreciated from the above discussion, then, the Data Collector 112A may be configured to collect performance data related to the performance or execution of, e.g., the running Task 108, while the running Task 108 is executing with a current number of nodes from the pool of nodes within the Logical Resources 106. In the example of FIG. 1, the running Task 108 is illustrated as being executed with 3 nodes, node 106A, node 106B and node 106C from pool nodes 106A . . . 106N of the Logical Resources 106. The Performance Calculator 112B may thus be configured to receive performance data collected by the Data Collector 112A, and to determine a measurement characterizing the performance of the Task 108 during the time of the data collection.

In the present context, the term performance may generally refer to a nature of a time consumption associated with executing a fixed-size data process. There are many known techniques for measuring and characterizing a performance of an executing hardware or software task, so that such examples are not discussed herein in detail. By way of example, however, it may be appreciated that such performance characterizations may be made in terms of an elapsed time associated with a particular task or subtask thereof, or may be associated with a number of cpu cycles needed to complete a task, or with a quantity of data throughput within a predefined amount of time. Other performance characterizations may be substituted, as would be apparent.

In this regard, it may be further appreciated that inasmuch as the reduction function of Eq. 1 represents a performance characteristic(s) of executing a task with multiple parallel nodes, relative to executing the task with a single node (which, as defined above, is considered to take a time T), the reduction function of Eq. 1 also may be expressed using any of the above-referenced performance metrics/techniques. Further, inasmuch as performance data is represented by such performance metrics/techniques and used to characterize aspects of the reduction function of Eq. 1, as described below with respect to Eq. 2, it may be appreciated that the same metrics/techniques may be used to express both the actual measured performance data and the theoretical representation of performance characteristics represented by the reduction function of Eq. 1.

Once relevant performance data is collected and characterized, a current performance with a current number of nodes may be recorded within the Performance Cache 112D. Then, the Adjustment Manager 112C may be configured to adjust a number of nodes executing the Task 108 from the current number to a larger or smaller number of nodes. Techniques for making such adjustments are described in more detail below, but, in general, it may be appreciated from the above discussion that such adjustments may be used (e.g., by the Calibrator 114) to characterize parallelism overhead costs associated with parallelizing the Task 108, so that an optimal number of nodes for calculating the Task 108 may be determined therefrom. In particular, once the adjustment is made from the current number of nodes to a new or second number of nodes, then the Data Collector 112A may repeat the collection of relevant performance data, so that the Performance Calculator 112B may also repeat its calculations characterizing performance of the Task 108 using the collected data.

Figure 2B:
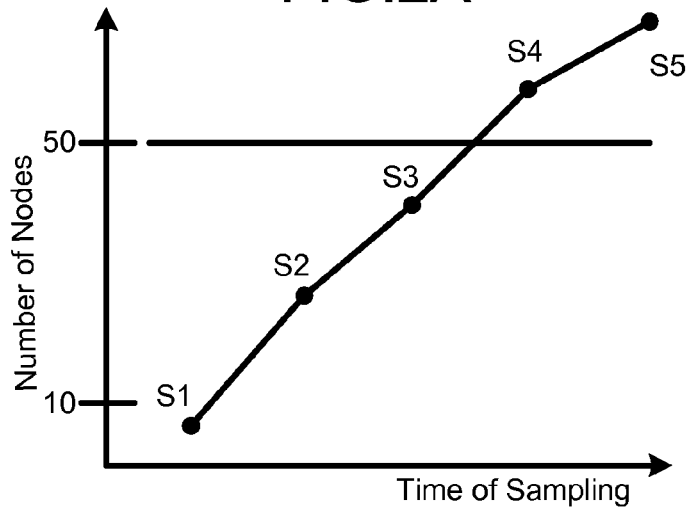
FIG. 2B is a graph illustrating an elapsed processing time relative to a number of nodes.

FIG. 2B is a graph illustrating examples of the above-referenced operations of the Sampler 112 and subcomponents 112A-112D thereof. In particular, FIG. 2B illustrates a graph in which the X axis illustrates a time of sampling (i.e., data collection), while the Y axis represents a number of nodes currently being used to process the running task, e.g., the running Task 108. The sample points S1-S5 thus represents 5 different instances at which the Sampler 112 executes the above-described sampling operations with respect to components 112A-112D thereof.

In particular, the Sampling point S1 represents a first operation of the Data Collector 112A in collecting data, as well as subsequent performance calculations performed by the Performance Calculator 112B. As illustrated, a corresponding number of nodes at the Sampling time 51 is approximately 10 nodes. Subsequently, the number of nodes may be adjusted upwards by the Adjustment Manager 112C of FIG. 1 and operations of the Data Collector 112A and the Performance Calculator 112B may again be repeated at the sampling point S2 and ultimately at each Sampling point and for each corresponding adjusted number of nodes.

For purposes of example and explanation, the graph of FIG. 2B is assumed to correspond to the graph of FIG. 2A. That is, FIG. 2B assumes that, as shown, an optimum number of nodes for executing in parallel to execute the task in question is approximately 50 nodes. Therefore, as shown in the example of FIG. 2B, this optimum number of nodes will be passed during the Sampling operations of the Sampler 112A and between sample points S3 and S4. In such an example, an operator of the System 100 may become aware that the optimum number of nodes has been passed by observing that performance data related to Sampling point S4 is decreased with respect to performance data calculated with respect to a Sampling point S3.

As referenced above, and described in more detail below, the sample performance data collected by the Sampler 112 may then be passed to the Calibrator 114. The Calibrator 114 may then proceed to obtain a characterization of parallelism overhead cost associated with parallelizing the Task 108, based, e.g., on the most recently sampled data from the Sampler 112. The Calibrator 114 may then use the characterization of the parallelism overhead cost to calculate an optimum number of nodes for executing the running task, and thereby provide such instruction to the Resource Scheduler 104 to assign this optimum number of nodes from the pool of nodes of the Logical Resources 106.

In more detail, as referenced above, the Calibrator 114 may use the sample data from the Sampler 112 to provide a characterization of the overhead function O(n) of the reduction function of Eq. 1, above. For example, as described below, the overhead function O(n) may be characterized as a linearly or monotonically increasing function (e.g., increasing with respect to the elapsed time, or, put another way, decreasing with respect to a desired performance), which is characterized by its rate of increase with respect to a number of nodes being used. In other words, for example, the overhead function O(n) may be represented by the term ($\alpha$*n) where $\alpha$ thus represents a linear rate of change of the overhead cost associated with corresponding increases or decreases in the number of nodes being used in parallel to execute the Task 108.

Consequently, the Calibrator 114 may include an Overhead Factor Calculator 114A which is configured to calculate the overhead factor $\alpha$, as just described. Then the Calibrator 114 also may include a Node Optimizer 114B which may input the overhead factor $\alpha$ and determine the optimal number of nodes therefrom.

As described above, the Calibrator 114 receives sample data from the Sampler 112 representing a difference in performance times at corresponding different numbers of nodes, such as the difference in performance time (e.g., elapsed time) associated with the number of nodes at Sampling point S2 as compared to a number of nodes at Sampling point S1 of FIG. 2B. In other words, a performance associated with a number of nodes at Sampling point S2 may represent a performance with a new or adjusted number of nodes, represented as $P_{new}$, while, correspondingly, a previous performance (as cached within the Performance Cache 112D), e.g., at the Sampling point S1, may be represented as $P_{old}$, representing performance of the task at Sampling point S1 associated with an old or previous number of nodes.

As described above with respect to Eq. 1, the reduction function of Eq. 1 represents, in part, an amount or extent to which the performance of a particular task is reduced or improved by addition of additional nodes executing in parallel to execute the task. In other words, as referenced above, the reduction function f(in) when n=1 is considered to be time "T" equivalent to execution of the task using a single node. In other words, the reduction function may be considered to be normalized with respect to the factor T. Consequently, in order to use the performance times $P_{new}$ and $P_{old}$, the difference between the 2 calculated performance times may also be normalized with respect to the factor T. Thus, a change in performance related to a corresponding change in a number of nodes assigned to an executing task may be represented by Eq. 2:

$$f_n(N_{new}) - f_n(N_{old}) = (P_{new} - P_{old})/T \qquad \text{Eq. 2}$$

in which the theoretical difference in the reduction function using the corresponding different number of nodes is equated with the actual measured performance difference observed during operation of the Sampler 112, e.g., with respect to the difference in performance in the Sampling point S2 with respect to the performance of the Sampling point S1. Then, by inputting the known and/or observed values of the various parameters of Eq. 2, it is straightforward to solve for the overhead factor α when, as described above, the overhead function O(n) is assumed to be represented or characterized by the function (αn).

In other words, the Overhead Factor Calculator 114A may be configured to execute the above described calculations, and thereby determine the overhead factor α. As may be appreciated, using the data collected at the Sampling points S1 and S2 of FIG. 2B in the manner described above in order to obtain the overhead factor α permits the Node Optimizer 114B to estimate or extrapolate an effect of parallelism overhead cost as more nodes are added or removed with respect to parallel execution of the relevant executing task.

In the example discussed above, in which the overhead function O(n) is represented as an ideal linear function αn which the parallelism overhead costs increase linearly at a certain rate a with the addition(s) of additional nodes, the determined overhead factor α from the Overhead Calculator 114A may then be inserted into the reduction function of Eq. 1. Then, it is straightforward to optimize the reduction function of Eq. 1 to obtain an optimized number of nodes $n_{op}$. Once the Node Optimizer 114B has calculated the optimal number of nodes $n_{op}$, the Adaptive Resource Controller 102 may instruct the Resource Scheduler 104 accordingly to assign the optimum number of nodes $n_{op}$ from the pool of nodes of the Logical Resources 106 to the executing task in question e.g., to the Task 108.

In the specific examples of FIG. 1, for example, the above-described operations of the Adaptive Resource Controller 102 may be applied to the executing Task 108 using the 3 parallel nodes 106A, 106B, 106C. During operations of the Adaptive Resource Controller 102, for example, a number of nodes used to execute the Task 108 may be altered or adjusted in correspondence with performance data collected in association with such adjustments, so that a corresponding overhead factor α may be obtained and, ultimately, a corresponding optimal number of nodes $n_{op}$ may be determined.

In the example, it may result that these operations of the Adaptive Resource Controller 102 may indicate that the optimal number of nodes is in fact the current number of nodes, i.e., 3 nodes. In this case, the Task 108 may continue executing with the 3 nodes 106A, 106B, 106C, and the Calibrating Duration Controller 116 may monitor these operations of the Adaptive Resource Controller 102 and determine that a minimal (or no) optimization of resource allocations to the Task 108 was necessary. Consequently, the Calibrating Duration Controller 116 will determine that the calibration cost associated with the operations of the Adaptive Resource Controller 102 were, in fact, not necessary, and may therefore increase the time interval until the next such operation of the Adaptive Resource Controller 102. Conversely, if the Calibrating Duration Controller 116 observes that a large change in the number of nodes executing the Task 108 occurred as a result of the operations of the Adaptive Resource Controller 102, then the Calibrating Duration Controller 116 may be configured to reduce the time interval until the next iteration of the operations of the Adaptive Resource Controller 102. In this way, as referenced above and as described in more detail below, the Calibrating Duration Controller 116 may be configured to dynamically and accurately adjust the frequency with which the Adaptive Resource Controller 102 attempts to optimize a number of nodes executing a particular task, and may thereby assist in obtaining optimization of execution of the task in question, while minimizing a calibration cost associated with such optimizations.

In so doing, the Calibrating Duration Controller 116 overcomes a difficulty in assigning an optimal number of nodes to executing tasks. For example, as referenced above and described in more detail below, it may occur that a particular task includes a number of subtasks, each of which may be associated with a different optimal number of nodes for execution thereof. However, it may be difficult to know in advance which subtask may actually need to be executed during operation of the corresponding overall task, and/or it may be difficult to accurately estimate a number of nodes associated with optimal execution of each subtask.

For example, in FIG. 1, the Task 110 is illustrated as including subtask 110A and the second subtask 110B. As shown, the subtask 110A may represent a subtask that is relatively amenable to parallelization, e.g., may be associated with a small or slowly increasing overhead function O(n). In contrast, the subtask 110B may be associated with a task that is relatively less amenable to parallelization, i.e., that has a quickly or sharply increasing overhead function O(n). In other words, in the examples given above in which the overhead function O(n) is represented as in ideal linear function αn, it may be observed that the subtask 110A has a relatively small value of α, while the subtask 110B has a relatively large value of α. During processing of the Task 110, therefore, a transition from the subtask 110A to the subtask 110B will be associated with a corresponding transition in associated overhead functions, and associated parallelism overhead costs.

Advantageously, it may be observed that the Adaptive Resource Controller 102 may operate to assign nodes throughout an execution of the Task 110, without requiring prior knowledge of the nature or extent of the subtask 110A, 110B. For example, the Adaptive Resource Controller 102 does not require prior knowledge about a nature of the subtask 110A, 110B, nor of associated parallelism overhead cost associated with the execution thereof. Rather, the Adaptive Resource Controller 102 may simply operate on an as-needed or as-determined basis throughout the execution of the Task 110, and by virtue of the operations described herein, will dynamically and adaptively determine an (or near-optimal) optimal number of nodes to be assigned to each subtask 110A, 110B.

For example, during execution of the subtask 110A, the Adaptive Resource Controller 102 may execute one or more times to determine a current optimal number of nodes. Assuming for the sake of example that there is little variation in the optimal number of nodes associated with the subtask 110A during execution of the subtask 110A, the Calibrating Duration Controller 114A will consequently observe that such minimal variation of the optimal number of nodes occurs, and will therefore progressively lengthen time intervals between operations of the Adaptive Resource Controller 102 in determining a current number of optimal nodes.

On the other hand, once the subtask 110A ends and the subtask 110B begins, the Adaptive Resource Controller 102 will detect and determine the need for a new optimal number of nodes $n_{op}$. After such a large change in optimal number of nodes, as determined by a particular iteration of the operations of the Adaptive Resource Controller 102, the Calibrating Duration Controller 116 will decrease a time interval between subsequent operations of the Adaptive Resource Controller 102, so as to determine the new optimal number of nodes $n_{op}$ as quickly and accurately as possible. In this way, the Adaptive Resource Controller 102 may trend towards determination of the optimal number of nodes needed at a particular time for execution of currently running tasks or subtasks.

In some example implementations of the System 100 of FIG. 1, the Sampler 112 and the Calibrator 114 may be configured to attempt to characterize the parallelism overhead cost described by the overhead function O(n) in as exact or detailed manner as possible. For example, in an ideal situation, the Adaptive Resource Controller 102 may be configured to characterize the overhead function O(n) exactly, in which case it would be possible for the Calibrator 114 to determine an optimum number of nodes associated with execution of a particular task in only a single iteration or operation of the Adaptive Resource Controller 102.

In more typical or more realistic scenarios, however, it may be too difficult or may not be worth the necessary effort to attempt to characterize the overhead function O(n) to this level of exactness. For example, there may be too many factors associated with determining the overhead function to this level of certainty to make such example implementations feasible in many scenarios. Rather, in the examples described above, the Calibrator 114 and the Sampler 112 may be configured to assume a relatively simplistic representation of the overhead function O(n), specifically, may assume that the overhead function is ideally linear and thus represented by the function $\alpha n$. Although such a representation is known to be potentially unlikely to be highly accurate or representative in characterizing a particular overhead function, the Adaptive Resource Controller 102 may nonetheless approach an accurate optimization of the number of nodes necessary by virtue of repeated iterations or operations of the Sampler 112 and the Calibrator 114, at time intervals determined by the Calibrating Duration Controller 116, as described herein.

Figure 2C:
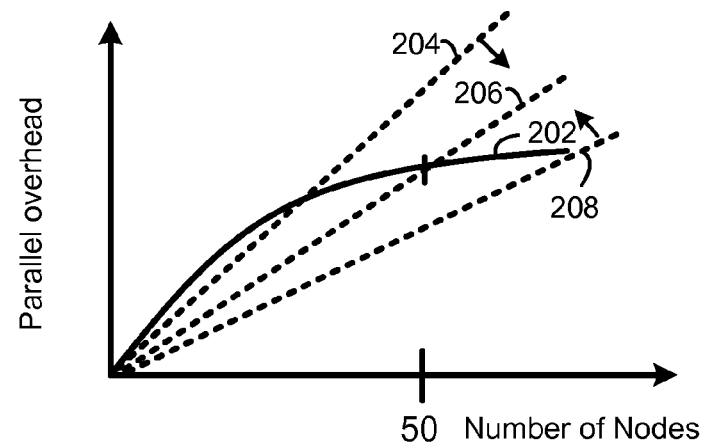
FIG. 2C is a graph illustrating parallel overhead relative to a number of nodes.

For example, as shown in the illustration of FIG. 2C, a graph of the overhead function O(n) is shown, with parallelism overhead on the Y axis of the graph of FIG. 2C represented as a function of the number of nodes, so that the latter is shown on the X axis of FIG. 2C. In FIG. 2C, a Curve 202 illustrates a conceptualization of an actual overhead function O(n), which, as described above, may not be known or discoverable to an operator of the System 100, or may not be worth the commensurate effort needed to obtain such an accurate representation of the overhead function. Meanwhile, the lines 204, 206, 208 represent idealizations of the actual Overhead Function 202, as represented by the estimated or ideal linear function $\alpha n$ using the examples above. Thus, as shown in FIG. 2C, the Adaptive Resource Controller 102 may execute through 3 iterations or operations in order to come as close as possible to determining an optimal number of nodes to be assigned to the executing task in question (which, in the example of FIG. 2C, is assumed to be $n_{op}=50$, for sake of consistency with the earlier examples of FIGS. 2A and 2B).

In more detail, it may be appreciated that the line 204 represents a first iteration or operation of the Adaptive Resource Controller 102 in which the line 304 having a first value of $\alpha$ is obtained, which would lead to a first determination of an optimum number of nodes. Then, in a second iteration or operation of the Adaptive Resource Controller 102, a second line 308 having a second value of the overhead factor $\alpha$ may be determined. As illustrated, it may occur that there may be an overshoot or over-compensation or oscillation around the actual Curve 202 of the overhead function in question. However, as shown, in the third iteration or operation of the Adaptive Resource Controller 102, a third line 206 having a third value of the term $\alpha$ may be obtained, which intersects the actual Curve 202 of the overhead function at approximately the optimum number $n_{op}=50$ of nodes needed for execution of the task in question.

In this way, through multiple iterations or operations of the Adaptive Resource Controller 102, the System 100 may trend toward the optimum number of nodes, without ever having to determine the overhead function represented by the Curve 202 beyond the level of detail or accuracy represented by the lines 204, 206, 208. That is, the Adaptive Resource Controller 102 allows the System 100 to trend toward the optimum number of nodes, and/or to trend within a relatively close range or boundary around the optimum number of nodes. Moreover, as described above, the Calibrating Duration Controller 116 may be configured to ensure that initial relatively wide or abrupt changes between determined optimal number of nodes are associated with relatively frequent operations or iterations of the Adaptive Resource Controller 102. Conversely, once the Adaptive Resource Controller 102 begins to oscillate within a relatively small range around the optimum number of nodes, then the Calibrating Duration Controller 116 may reduce the frequency of operations or iterations of the Adaptive Resource Controller 102, so as to minimize any calibration overhead cost associated with each operation of the Adaptive Resource Controller 102.

Although the above description provides various examples of operations of the System 100, it will be appreciated that various other example implementations, some of which are described in more detail herein, also may be implemented. For example, it is described above that the Sampler 112 may be configured to determine and provide at least two performance characterizations associated with at least 2 different number of nodes used in parallel to execute the running task in question. Then, as described, the Calibrator 114, specifically, the Overhead Factor Calculator 114A, may use these two performance measurements to determine the overhead factor $\alpha$, which has been provided to the Node Optimizer 114B.

In other example implementations, the Sampler 112 may execute more than two determinations of such performance measurements over a period of time, e.g., may determine performance measurements associated with the 5 Sampling points S1-S5 illustrated in the example of FIG. 2B. Then, the Overhead Factor Calculator 114A may use multiple pairs of the associated performance measurements to obtain multiple values of the overhead factor $\alpha$. Then, the Overhead Factor Calculator may determine an average value of $\alpha$ associated with the plurality of determined values of $\alpha$, so that the Node Optimizer 114 may proceed with its determination of the optimal number of nodes $n_{op}$ based on the average value of $\alpha_{ave}$. In this way, the Overhead Factor Calculator 114A may provide a more stable and/or more accurate value of the overhead factor $\alpha$ for use by the Node Optimizer 114B.

In the example of FIG. 1, the Adaptive Resource Controller 102 is illustrated as being executed on a Computing Device 118, which, as known and as described in more detail herein, may include or represent virtually any computing device which may be configured to execute the functions of the Adaptive Resource Controller 102 as described herein, including any necessary or desired associated hardware or software, including appropriate processor, memory, display, or other associated computing resources. Although in the example of FIG. 1, only the Adaptive Resource Controller 102 is illustrated as being executed by a computer device, it will be appreciated that the Resource Scheduler 104, the pool of nodes and the Logical Resources 106, and the Task 108, 110 all may also represent the same or different Computing Device 118 and/or associated computing devices, as would be apparent. For example, various ones of the components of the System 100 of FIG. 1 may be implemented on a single computing device, or may be implemented on multiple computing devices which are in communication with one another via a network. Various other implementations would be apparent to one that is skilled in the art.

Figure 3:
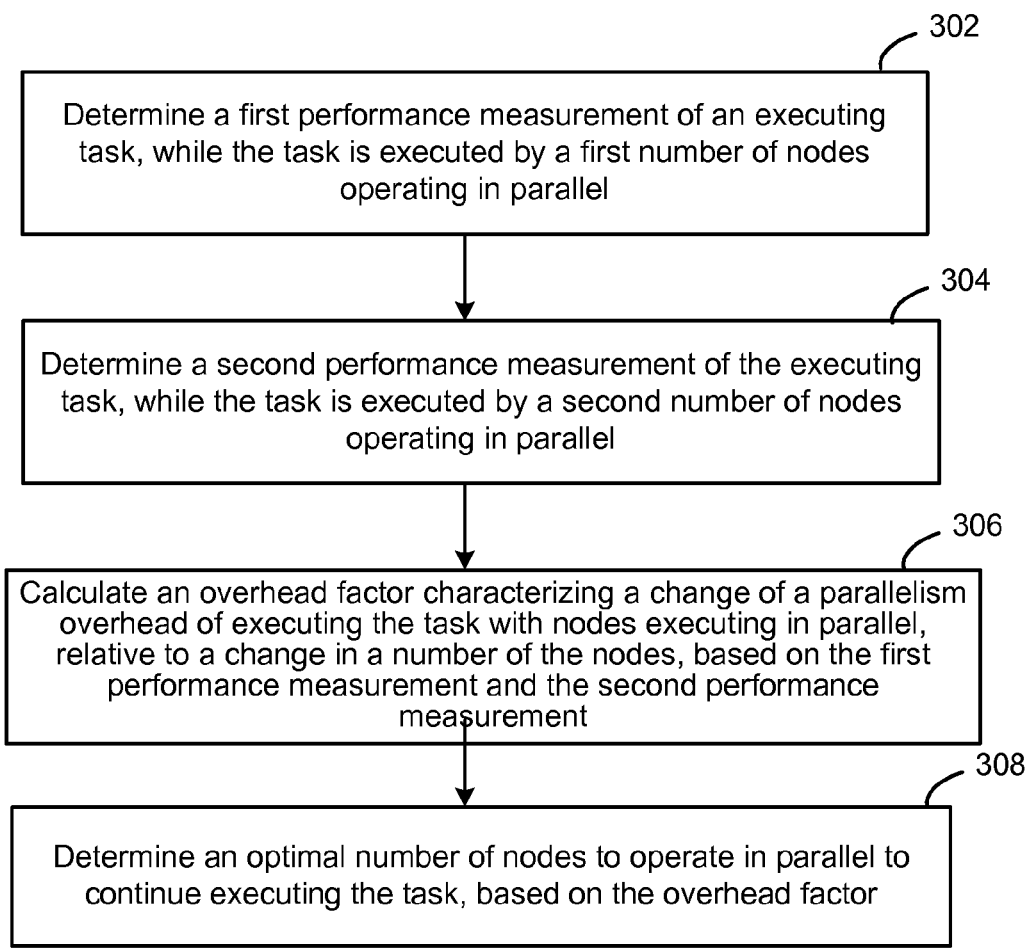
FIG. 3 is a flowchart illustrating example operations of the system of FIG. 1.

FIG. 3 is a Flowchart 300 illustrating example operations of the System 100 of FIG. 1. In the example of FIG. 3, Operations 302-308 are illustrated as being executed in a sequence. However, it will be appreciated that such illustration is merely for the sake of example and understanding, and is not limiting with respect to operations of the System 100 of FIG. 1. For example, it will be appreciated that the Operations 302-308 may be executed in a different order, except as otherwise required herein, or may be operated such that various ones of the Operations 302-308 occur in parallel, or in an overlapping fashion, unless otherwise specified herein.

In the example of FIG. 3, a first performance measurement of an executing task may be determined, while the task is executed by a first number of nodes operating in parallel (302). For example, the Data Collector 112A of the Sampler 112 may determine a first performance measurement of the executing Task 110, while the Task 110 is executed by the first number of the nodes (e.g., the 4 nodes 106D-106G illustrated as executing the subtask 110A in FIG. 1). As may be appreciated, the Data Collector 112A may collect data associated with execution of the Task 110 by the first number of nodes operating in parallel, whereupon the Performance Calculator 112B may determine the associated performance measurements for the Task 110, as described above, e.g. for storage within the Performance Cache 112D. For example, such a performance measurement may be determined with respect to the Sampling point S1 of FIG. 2B.

Then, a second performance measurement of the executing task may be determined, while the task is being executed by a second number of nodes operating in parallel (304). For example, the Adjustment Manager 112C of FIG. 1 may be configured to adjust the number of nodes from the first number of nodes to the second number of nodes for executing the Task 110. For example, the Adjustment Manager may alter the number of nodes from four to some other larger or smaller number of nodes (not specifically illustrated in the example of FIG. 1). Then, the operations of the Data Collector 112A may be repeated in collecting appropriate performance data, so that the Performance Calculator 112B may determine the second performance measurement with the second number of nodes, as referenced above. As may be appreciated, such a performance measurement may thus be associated with one of the other Sampling points of FIG. 2B (e.g., the Sampling point S2).

An overhead factor characterizing a change of a parallelism overhead of executing the task with nodes executing in parallel may then be calculated, relative to a change in a number of the nodes, based on the first performance measurement and the second performance measurement (306). For example, the Overhead Factor Calculator 114A may receive the first performance measurement and the second performance measurement, and may determine the overhead factor $\alpha$ as described above (e.g., using Eq. 2). As also described above, the overhead factor $\alpha$, in the specific examples provided, characterizes the change in parallelism overhead cost of executing the Task 110 using parallel nodes of the pool of nodes from the Logical Resources 106 by representing the change of the parallelism overhead as a linear function having a certain rate of change relative to a corresponding change in the number of the nodes. Of course, this is just one example, and other types of function than linear functions, such as, e.g., exponential functions, may be selected. Selection and use of a particular type of function may depend, for example, on a nature of the underlying actual parallelism overhead costs, since, e.g., a designer may wish to represent the overhead function O(n) in a particular manner thought to be most closely representative of actual parallelism overhead costs.

Then, an optimal number of nodes to operate in parallel to continue executing the task may be determined, based on the overhead factor (308). For example, the Node Optimizer 114B may receive the overhead factor from the Overhead Factor Calculator 114A, and may use the reduction function of Eq. 1 to determine the optimal number of nodes $n_{op}$, using standard mathematical techniques (e.g., setting a derivative of the reduction function equal to zero, or by conducting sufficient example calculations of the reduction function to determine $n_{op}$). Subsequently, the Calibrator 114 may provide instruction to the Resource Scheduler 104 to assign this optimal number of nodes $n_{op}$ to the task or subtask in question, e.g., the Task 110, or, more specifically, the subtask 110A.

Figure 4:
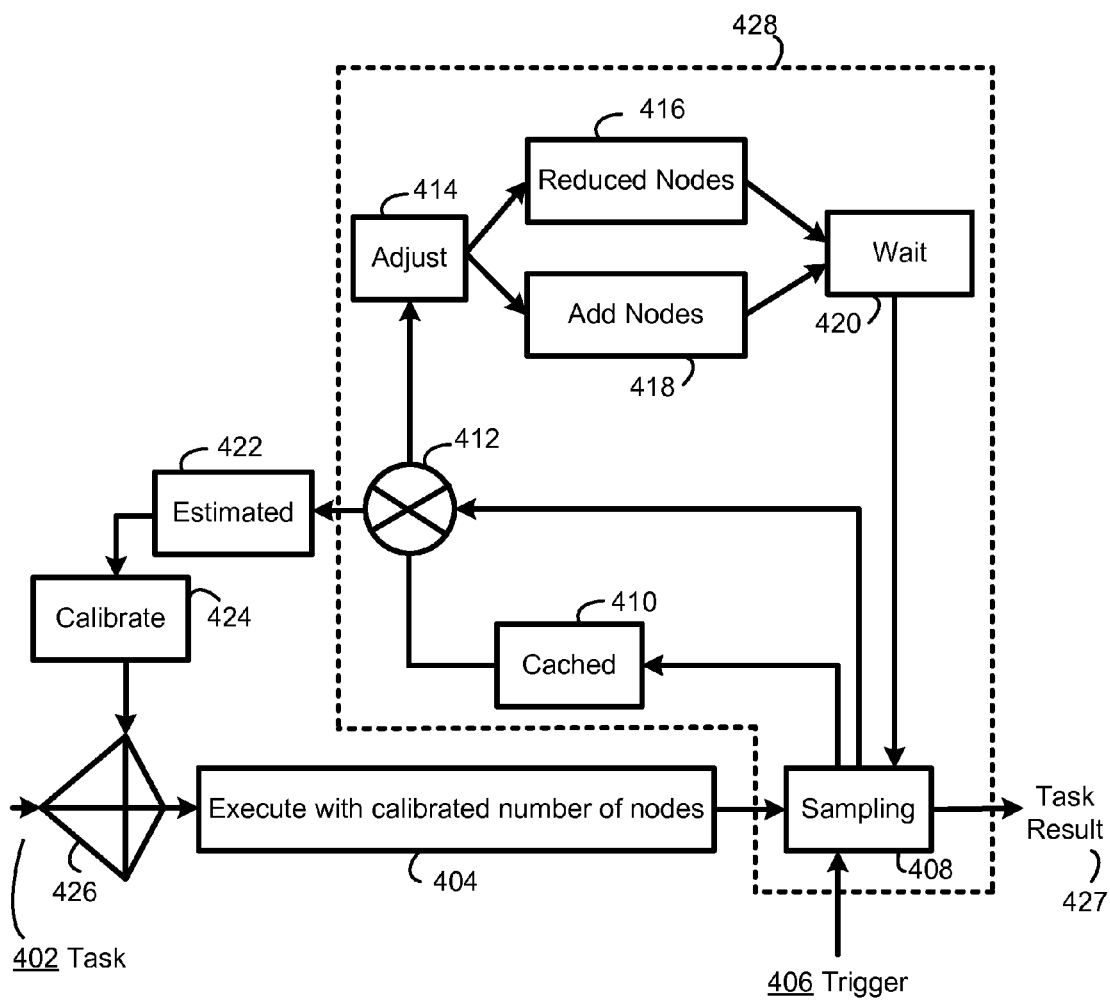
FIG. 4 is a flowchart illustrating an example implementation of the system of FIG. 1.

FIG. 4 is a block diagram illustrating example operations of the System 100 of FIG. 1 in further detail. In the example of FIG. 4, a Task 402 is executed with a previously or currently calibrated number of nodes at Operation 404. At a certain point in time, a Trigger 406 causes the Sampling 408 of performance data associated with the task 402 to occur. For example, a Sampling 408 may include the data collection and associated performance determination of the Data Collector 112A and the Performance Calculator 112B, respectively, as described above.

Then, the determined performance measurement, i.e., a first performance measurement, may be cached 410, e.g., within the Performance Cache 112D of FIG. 1. Subsequently, the Adjustment Manager 112C may adjust 414 the number of nodes executing a parallel to operate the task 402. In a first or initial operation of the Adaptive Resource Controller 102, the adjustment may be predetermined, and/or may be a random adjustment in terms of direction (i.e., increasing or decreasing) or in magnitude (i.e., in terms of number of nodes being added or removed). That is, nodes are either added 418 or reduced 416, after which a waiting operation 420 commences. More specifically, the waiting operation 420 may be understood to represent a determined or designated amount of time necessary to allow a steady state operation of the task 402 to be obtained. In other words, based on the type of the task 402, the nature of the nodes 106, the nature of the performance measurement being determined, or on other factors, a different amount of time may be required for the waiting operation 420 in order to obtain subsequent meaningful/useful measurements in the next Sampling iteration of the Sampler 112.

The Sampling operation 408 then executes a second performance measurement which is obtained in response to a second Trigger 406 and may be output for a comparison operation 412 relative to the cached value of the first performance measurement 410. Based on the comparing operation 412, the Adjustment Manager 112C may determine the nature of a subsequent recurrent Adjustment Operation 414. For example, as referenced above, the Adjustment Manager 112C may determine whether an addition 418 of more nodes to execute the task 402 was associated with an improvement in the second performance measurement relative to the first performance measurement (e.g., a decrease in the measured elapsed time). If so, the Adjustment Manager 112C may determine to continue adding nodes in parallel for execution of the task 402, i.e., may execute the add nodes operation 418.

Conversely, if the Adjustment Manager 112C determines that the addition of nodes caused an actual decrease in the second performance measurement relative to the first performance measurement, then the Adjustment Manager 112C may determine that the optimal number of nodes was already exceeded, so that addition of more nodes would only further exacerbate the decrease in performance capabilities for executing the task 402. Consequently, the Adjustment Manager 112C would execute the reduced nodes operation 416.

Similarly, if previous adjustments included a decrease in the number of nodes in the second performance measurement relative to the number of nodes used for the first performance measurement, then the Adjustment Manager 112C may consider whether such a decrease in nodes resulted in a corresponding improvement of the second performance measurement relative to the first performance measurement. In the case where reducing the number of nodes improved the performance measurement (e.g., made the elapsed time smaller), then the Adjustment Manager 112C may conclude that it may be beneficial to continue reducing the number of nodes by executing the reduce nodes operation 416, presumably to thereby bring the number of nodes closer to the optimal number of nodes. On the other hand, if a previous reduction in nodes was associated with a worsening performance, then the Adjustment Manager 112C may determine that more nodes should be added by virtue of the add nodes operation 418, so as to again attempt to move closer to the optimal number of nodes.

As at least two performance measurements become available in association with the comparing operation 412, such performance measurements also may be output for an estimation operation 422, in which, e.g., the overhead factor $\alpha$ may be determined, for example, by the Overhead Factor Calculator 114A. Then, a calibration operation 424 may occur in which the overhead factor $\alpha$ from the estimation function 422 is used to determine the optimal number of nodes. Then, at operation 426, the determined optimal number of nodes may be actually assigned to the task 402, so that execution 404 with this calibrated number of nodes may continue.

In this way, task result 427 for the task 402 may continually be determined, i.e., a primary desired result or outcome of the actual executing task 402. Further, the dotted line box 428 representing the Sampling operation of the Sampler 112 may be understood to be executed as many times as necessary within a particular iteration of the Adaptive Resource Controller 102, or within various different operations of the Adaptive Resource Controller 102. For example, as referenced above, the Sampling operations of the dotted line box 428 may occur more than two times within a particular operation of calibration for the Adaptive Resource Controller 102, so that multiple values of the overhead factor $\alpha$ may be obtained for use in determining an average value thereof.

Additionally, or alternatively, subsequent operations of the Adaptive Resource Controller 102 may occur at time intervals determined by the Calibrating Duration Controller 116 of FIG. 1, as needed to maintain the optimal number of nodes within a desired range or proximity, while minimizing calibration overhead costs associated with the Sampling and calibrating operations of FIG. 4.

Figure 5:
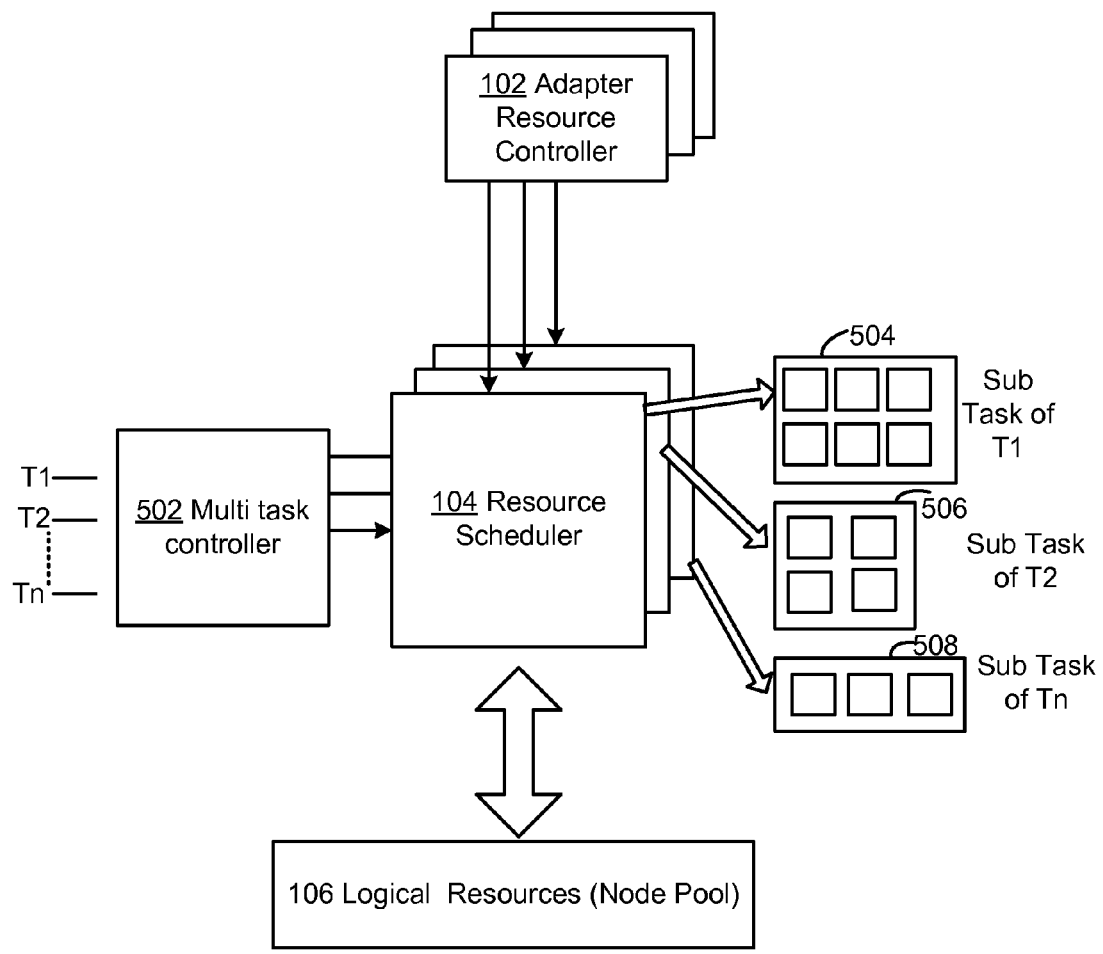
FIG. 5 is a block diagram of an implementation of the system of FIG. 1.

FIG. 5 is a block diagram of an example implementation of the System 100 of FIG. 1. FIG. 5 illustrates examples of the components 102, 104, and 106 of FIG. 1, in conjunction with a Multitask Controller 502. More specifically, the Multitask Controller 502 may be understood to represent a component configured to provide an additional layer of management control for the System 100 of FIG. 1 when allocating resources between a plurality of different tasks operating in parallel, where each one of the tasks is subject to operation of the Resource Scheduler 104 in assigning parallel nodes in the Logical Resources 106 according to the instruction of the Adaptive Resource Controller 102.

In other words, it may be appreciated that in an ideal scenario every task received by the System 100 or the System 500 may be configured to receive an optimal number of nodes assigned thereto. In practice, however, it may occur that only a finite number of nodes are available for parallel execution of the multiple task $T1 \ldots T_N$ which may be received at the System 500. In this case, it may occur that not all tasks may receive the calculated/desired optimal number of nodes associated therewith, since, for example, such an optimal number of nodes may not be available currently within the pool of nodes of the Logical Resources 106, or due to other constraints.

In one example, it may occur that a total number of nodes available in the Logical Resources pool 106 is equal to 13 nodes. Further, it may occur that due to operation of the Adaptive Resource Controller 102, it may be determined that an optimal number of nodes associated with tasks or subtasks thereof may be determined. More specifically, as shown in FIG. 5, the subtask 504 of the task T1 may execute in conjunction with the subtask 506 of the task T2 while the subtask 508 of the task $T_N$ also executes in parallel therewith.

In such a case, as illustrated, corresponding instances of the Adaptive Resource Controller 102 and the parallel Execution Scheduler 104 may respond in order to make corresponding necessary determinations of optimal number of nodes for each of the currently executing subtasks 504, 506, and 508. In such a case, it may occur that the optimal number of nodes determined for the subtask 504 is 10 nodes, while the optimal number of nodes associated with the subtask 506 is 5 nodes, and the optimal number of nodes associated with the subtask 508 is determined to be 3 nodes. In this case, it is apparent that the subtask 504, 506, 508 collectively require more nodes than the 13 nodes currently available within the pool of nodes of the Logical Resources 106.

In this case, the multitask controller 502 may be configured to provide a priority associated with each task or subtask, so that the Parallel Execution Scheduler 104 and/or the Adaptive Resource Controller 102 may make best or most-desired use of the available node resources. In the specific example, it may occur that, although the subtask 504 may be optimized with 10 nodes, a corresponding priority of the subtask 504 may dictate that only 6 nodes of the available 13 nodes are assigned thereto. Meanwhile, although the subtask 506 may be optimized with 5 nodes, as shown, only 4 nodes of the available 13 nodes are assigned thereto. Finally, in the specific example, the subtask 508 may be optimized with 3 nodes and, as shown, is actually assigned 3 nodes from the available pool of 13 nodes.

Thus, one line of reasoning for allocating the available nodes in this manner may be that the subtask 508 is the most highly-prioritized subtask, and therefore receives the actual optimal number of nodes necessary for completion thereof. For example, the subtask 508 may be associated with a task being executed by a customer associated with a high, level of quality assurance, or other service level guarantee. Similarly, the subtask 506 may be relatively highly prioritized, and may thus receive virtually all of the nodes necessary for optimal execution thereof. On the other hand, the subtask 504 may be given a lower priority, and therefore may receive only 6 of the necessary 10 nodes determined to be the optimal number of nodes for execution thereof.

In this or similar examples, other criteria may be executed by the Multitask Controller 502 for assigning available nodes. For example, even if the subtasks 504, 506, or 508 are similarly prioritized, it may be determined to assign the optimal number of nodes to the subtask 508, because, in the example, such an optimal number of nodes is relatively small and may be assigned thereto for prompt execution and completion thereof, so that the 3 assigned nodes in the example may be returned to the pool of nodes of the Logical Resources 106, and thereafter disbursed within and among the remaining executing subtasks 504, 506.

Thus, the multitask Controller 502 may be configured to assist the Adaptive Resource Controller 102 and/or the Parallel Execution Scheduler 104 during scenarios in which the number of nodes within the pool of nodes in the Logical Resources 106 is limited relative to the needs or other requirements of executing the various tasks T1 . . . $T_N$. Although specific examples have been given, it will be appreciated that many other examples may be implemented in which the Multitask Controller 502 assists in the allocation of available resources when the available resources are relatively limited. For example, the Multitask Controller 502 may entirely delay or restrain an execution of a particular task or subtask so that some other task may receive a number of nodes closer to its determined optimal number of nodes. Other examples would be apparent to one of skill in the art.

Further, although the Multitask Controller 502 is illustrated as a separate element in communication with the Resource Scheduler 104, it will be appreciated that such an illustration is merely for the sake of example. In other example implementations, the Multitask Controller 502 may be implemented as part of, or in conjunction with, the Adaptive Resource Controller 102. Again, other example implementations would be apparent to one of skill in the art.

Figure 6:
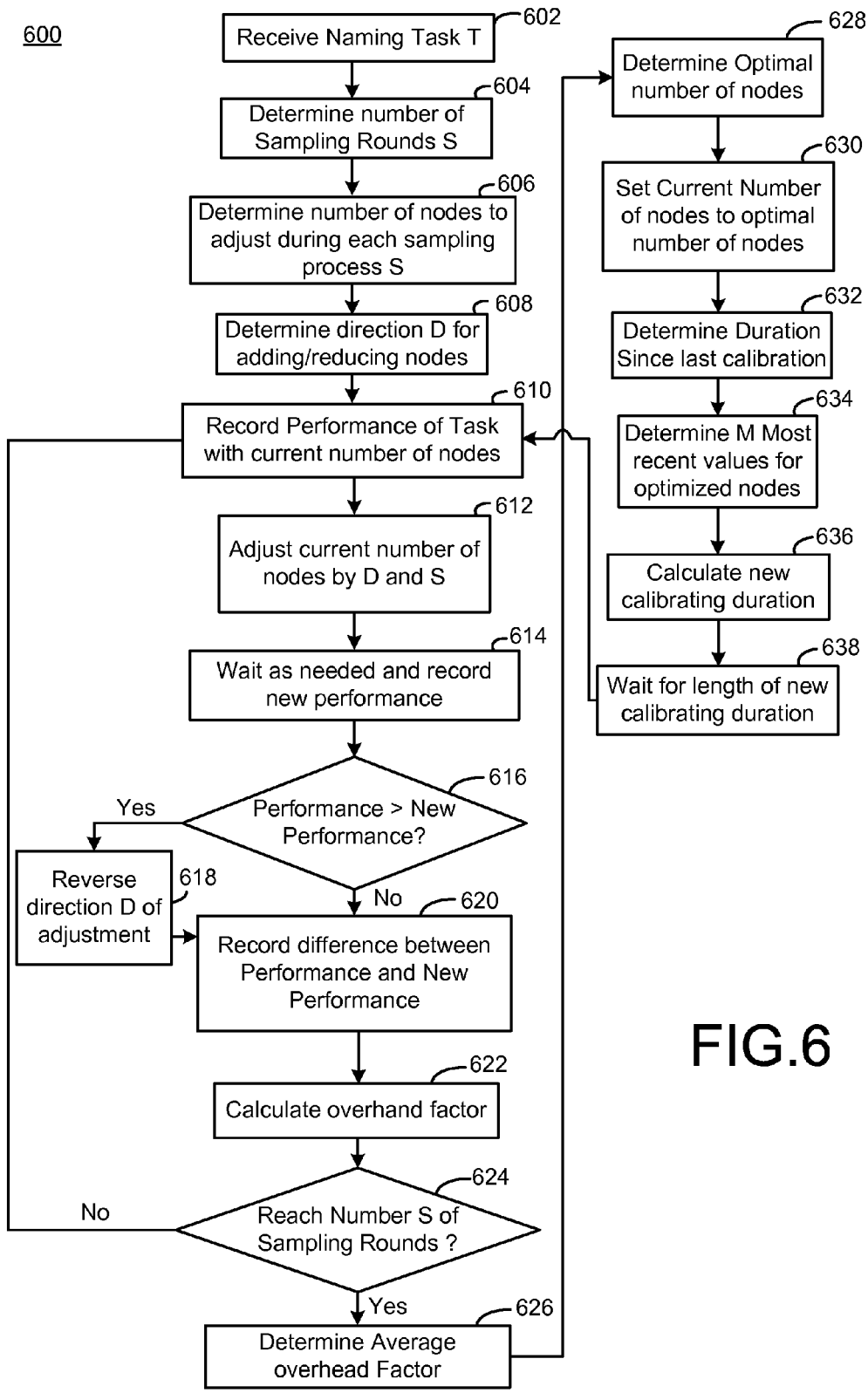
FIG. 6 is a flowchart illustrating example operations for executing the systems of FIGS. 1 and 5.

FIG. 6 is a Flowchart 600 illustrating additional example operations of the System 100 and 500 of FIG. 1 and FIG. 5, respectively. In the example of FIG. 6, a running Task T is received (602). A number of Sampling iterations/rounds S may be determined (604). For example, such a number of Sampling rounds may be pre-specified or predefined by an operator of the System 100, and may be associated with a number of Sampling rounds thought necessary to accurately calculate an accurate average value of the overhead factor α.

A number of nodes to adjust during each Sampling process, represented as δ, may then be determined (606). In other words, as referenced above, the Adjustment Manager 112C may be configured to adjust the number of nodes during a particular Sampling operation, as illustrated in more detail at operations 414, 416, 418 of FIG. 4. In the example of FIG. 6, the number of nodes δ specifies the quantity of nodes by which the Adjustment Manager 112C will increase or reduce a currently executing number of nodes during the Sampling process, as described in more detail below.

Similarly, a Direction D for adding or reducing the just determined number of nodes during each Sampling round may be determined (608). That is, as described above, nodes may be either added or subtracted during a given Sampling round, depending, for example, on whether the previous direction of the previous Sampling round yielded an improvement or degradation of performance relative to a proceeding Sampling round. In the first instance or iteration of the operations 600, the direction D may be assigned randomly and/or may be determined by the operator of the System 100 or 500.

Then, a performance of the running task with the current number of nodes may be recorded (610). For example, as referenced above, the Data Collector 112A and the Performance Calculator 112B may operate together to determine a first performance measurement associated with a first or current number of nodes. Then, the Adjustment Manager 112C may adjust the first or current number of nodes by D and δ, i.e., may either increase or decrease the current number of nodes higher or low according to D and δ.

The System 100 or 500 may then wait to an extent needed to record a new performance measurement (614). That is, as referenced above, an extent of such waiting may be dependent upon various node factors and/or may depend on the type of performance measurements, executing tasks, or node to be assigned, or combinations thereof, or other factors, as would be apparent.

If the previous performance was better than the current performance/new performance as measured using the current or new number of nodes (616), then the direction D may be reversed (618). That is, as referenced above, if the previous or first performance was better than the new or second performance, then the Adjustment Manager 112C deduces that the current direction of adding or removing nodes is illustrating a trend of degrading the performance, and therefore reverses the direction. Conversely, if the old or first performance is not better than the new or second performance, then the Adjustment Manager 112C may deduce that the comparison of performance measurements illustrates a trend of improving performance, and then may maintain the direction D of adjustment going forward.

A difference between the old or first performance and the new performance may then be recorded (620), and the overhead factor may then be calculated based thereon (622). For example, as described above, the Overhead Factor Calculator 114A may receive the performance measurements $P_{new}$, and $P_{old}$, and may compare these performance measurements relative to the execution time T associated with executing the task using just a single node, as shown in Eq. 2. The result of this comparison may then be set equal to a corresponding difference in the reduction function of Eq. 1; as evaluated using the corresponding first and second (i.e., old and new) number of nodes, as also shown in Eq. 2 above. In this way, the factor α may be factored out and determined by the Overhead Factor Calculator 114A.

If the number of Sampling rounds has not yet been reached, then operations continue with the recording of the performance of the task with the current (adjusted) number of nodes (610), and thereafter continues with performance of the operations 612-622, to thereby determine additional values of the overhead factor α. Once a number S of the values of α has been reached (624), then the average overhead factor $α_{av}$ may be determined (626).

Using the average value of the overhead factor $α_{av}$, an optimal number of nodes may be determined (628), e.g., by the Node Optimizer 114B. For example, as described above, the determined overhead factor $α_{av}$ may be inserted into the reduction function of Eq. 1, which then may be optimized to determine $n_{op}$. Consequently, the Calibrator 114 may provide an instruction to the Resource Scheduler 104 to set the current number of nodes to the thus determined optimal number of nodes (630).

Subsequently, as referenced above, the Calibrating Duration Controller 116 may operate to determine a length of a time interval until additional Sampling calibrating operations should occur. In particular, the Calibrating Duration Controller 116 may determine a duration of a time interval since the most recent calibration (632). Further, the Calibrating Duration Controller 116 may determine a number M representing the most recent values of optimized nodes during corresponding most recent calibration operations (634).

Using the measurement of the most recent duration and the value M of the most recent values of the optimized nodes, the Calibrating Duration Controller 116 may calculate a new calibration duration representing an interval of time until a subsequent Sampling calibrating operation should occur (636). Subsequently, the Adaptive Resource Controller 102 may wait for the length of the thus-determined new calibrating duration (638) before continuing therewith (i.e., for beginning to record performance of the task with the current number of nodes (610)).

That is, as described above, the Calibrating Duration Controller 116 may maintain or increase the length of the time interval of the new calibrating duration when the most recent values of optimized nodes are relatively close in value, since it may be inferred that the executing task is at or near its optimal number of nodes. Conversely, if the M most recent values for optimized nodes represent a relatively large variation with respect to one another, then the Calibrating Duration Controller 116 may decrease the new calibrating direction time interval relevant to the most recent duration of previous time interval. In this way, the optimal number anodes may be reached or approached in an efficient, while minimizing calibrating overhead cost associated with the Sampling calibrating operations described herein.

Formally, if $D_N$ is the length of a calibration duration CD to be calculated, and M (as described above) represents a constant number of previous CDs which affect the calculation of $D_N$, then a vector $<D_{N-M}, D_{N-M+1}, \ldots, D_{N-1}>$ represents past values of each CD. Then, a weight vector $<w_0, w_1, \ldots, w_{M-1}>$ predefines a weight assigned to each past value with a constratin that a summation of the weights within the weight vector equal to 1. To keep an effect of recent CDs larger than past CDs, the values in the weight vector may be formulated to grow monotonically from $w_i$ to $w_M$. With the definitions above, the original CD $D_{Org}$ which does not consider the optimal parallel degree can be calculated according to the accumulation of past CD values using the weights of the weight vector.

As described above, the effect of the most recent calibration result(s) also may be considered in determining the calibration duration. For example, if the estimated optimal number of nodes in a most-recent and current calibrating process is $O_{N-1}$ and $O_N$, then a ratio between these values shows how large of an adjustment was made. If the ratio is closer to 100%, the implication is that the currently-estimated degree of parallelism is almost equal with a most-recent estimation, while a ratio closer to 0% implies that the change in the optimal number of nodes is large. Using this ratio, the original CD $D_{Org}$ may be amplified by a factor Δ times the ratio, where Δ may be determined by experiment and/or user preference.

Thus, a current calibration duration CD may be calculated by Eq. 3:

$$D_N = \sum_{i=0}^{M-1} (D_{N-(M-i)} \times \omega_i) \times \left(\frac{\min(O_{N-1}, O_N)}{\max(O_{N-1}, O_N)}\right) \times \Delta) \quad \text{Eq. 3}$$

Algorithm 1 below illustrates a particular example of a Sampling-then-calibrating algorithm that may be implemented by the System 100 and 500 of FIGS. 1 and 5, respectively, and as generally represented by operation 602-630 of FIG. 6. As may be observed, algorithm 1 executes closely in conjunction with operations and nomenclature of operation 602-630 of FIG. 6, as described above.

Algorithm 1
Algorithm 1 Sampling-then-Calibrating algorithm

```
 1: FUNCTION Sampling-then-Calibrating
 2: IN/OUT: T /* Running task */
 3: IN: S /* Pre-defined the number of rounds of sampling processes */
 4: IN: δ/* Fixed number of adding/reducing parallel nodes during each sampling process */
 5: BEGIN
 6: Int I := 1 /* A counter for the sampling times in sampling process */
 7: Direction D /* A signal for reducing or adding nodes for running task */
 8: while I ≤ S do
 9:     P_org := RecPerformance(T)/* Record current performance data of running task */
10:     Int N_org := RecNodes(T)/* Record the number of nodes for current running task */
11:     AdjustNodes(D, T, δ) /* Adjust the number of nodes with pre-defined step according to the direction. For
            example, if direction is "reducing", the number of nodes for running tasks should be reduced with number
            of δ */
12:     Duration(t) /* Run the task with a time interval t. The target is to change the performance of task into a
            stable stage with new number of nodes */
13:     P_new := RecPerformance(T)
14:     if (P_org ≥ P_new) then
15:         Reverse(D)/* Change the signal reversed with last one, if performance of running task is reduced */
16:     end if
17:     DeltaPerf p := P_new − P_org/* Record the data of performance change */
18:     FactorArrary FA[I] := CaculateOverhead(p, δ) /* Caculate the factor for linear simulation of parallel
            overhead */
19:     I := I + 1
20: end while
21: Factor α := Average(F A)/* Use average of factors from all sampling processes for a precise factor */
22: Int N_opt := EstimateOptimal(α)/* Estimate the optimal point by linear functional definition of parallel over-
        head. Both below and above optimal point, the performance of task running is less than that in optimal point
        */
23: Calibrate(T, N_opt)/* Calibrate the number of nodes to running task with estimated optimal value */
24: return T
25: END
```

Thus, example pseudo code of resource calibration is described in Algorithm 1. As shown and described, the inputs contain one running task and two parameters, i.e., sampling times and a step of add/reduce parallel nodes. Line and 7 set the initializing values, including the counter of sampling process and initial direction of adjustment. In the example, the initial direction is random one of reducing or adding nodes, since the sampling process attempts to find the performance change which does not impact the overall performance very much. From line 8 to line 20, the sampling process is implemented and one overhead factor α is calculated. This process can be looped according to input sampling times S. Lines 9 and 10 record the performance data and current number of parallel nodes, and line 11 adjusts the degree of parallelism. Line 12 keeps the task executing with a short time interval to make reduced/added nodes running in a stable manner. Line 13 records the new performance data. From line 14 to 16, the adjustment of sampling may be reversed if needed. The performance differentiation is recoded in line 17. Based on this, one instance of the overhead factor in linear simulation of parallel overhead is calculated. After the sampling process, the average factor $α_a$, is calculated in line 21, and line 22 estimates the optimal point for the current running task T. In a final stage, line 23 applies the optimal number of nodes by assigning the number of nodes to the running task.

The following is a specific example(s) of operations of the systems 100 and 500 of FIGS. 1 and 5, using Algorithm 1. As referenced above, different types of tasks or sub-tasks may be associated with different techniques for parallelization and corresponding different overhead functions O(n). For example, for a query of a parallel DBMS, parallelization may rely on the fact that the table may be horizontally partitioned and an aggregation function can be computed locally on each partition. Then results from each partition are assembled to compute the final result. For COUNT and SUM operations, the final result is simply the summation of the results from all the partitions. MAX and MIN operations can be obtained by choosing the maximum and minimum of the results from all the partitions. The AVG operator can be computed by leveraging the results of SUM and COUNT.

In contrast, for a Map-Reduce operation, in a first phase, the Map function reads a set of "records" from an input file, and does Max/Min filtering or COUNT/SUM transformations. The outputs are partitioned to a set of intermediate records in the form of new key/value pairs by a "split" function. In the second phase, the Reduce function reads these records over the network from the Map nodes' local disks, and then processes Max/Min or combines COUNT/SUM of the records assigned to it, and then writes results to an output file.

The major difference between approaches above is the way to decide the number of parallel nodes, or the degree of parallelism. In parallel DBMS, the table is usually partitioned by the column value of grouping which causes idle or overutilized processing in an unbalanced data skew scenario. Meanwhile, in MapReduce programming, the scheduler, usually based on a hash splitting function, decides how many Map and Reduce instances should be applied. One obvious drawback is the large size of intermediate records and responding network transformations. Further, more parallel processes may result in more severe resource contention which makes parallel performance degrade.

As referenced, different kinds of operators may behave differently when they are parallelized. This is due to the fact, e.g., that the overhead of parallelizing an operator is closely related to the nature of the operator. For example, parallel AVG need both the SUM and COUNT of partitioning process, and a leveraging process of post-partitioning to obtain the correct final result, which introduces more overhead than the parallel SUM/COUNT.

By one round of sampling process and resource calibration, the parallel execution of a task will continue running with the estimated number of nodes. After the execution over a period of time, the original operator of data processing may be changed to another one, such as the change from the subtask 110a to the subtask 110b. Correspondingly, the estimated optimal degree of parallelism may become imprecise. For example, given a typical query "Find the average salary of employees which have been working more than 5 years," without consideration of optimization and pipeline techniques in parallel DBMS and data skew in Map/Reduce system, both operations may split the request into two steps. In the first step, filtering out the employee list with salary data may occur. Then, in the second step, calculating the average salary based on the temporary result in step one may occur.

Then, it may be observed that an optimal degree of parallelism in the filtering step is much different from that in the calculating step. If the optimal degree of parallelism is estimated and calibrated in step one, and these results are still used to run the task in step two, the task execution may become either over or under parallelized, which, as described, may necessitate use of the calibrating duration controller 116.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a non-transitory computer-readable medium, the system comprising:
   a sampler configured to determine a first performance measurement of an executing task, while the task is executed by a first number of nodes operating in parallel, and configured to determine a second performance measurement of the executing task, while the task is being executed by a second number of nodes operating in parallel; and
   a calibrator configured to compare the first performance measurement to the second performance measurement and calculate an overhead factor as characterizing an overhead function O(n) within a reduction function f(n)=(1/n)+O(n), where n represents a number of nodes and where the reduction function characterizes a change of parallelism overhead of executing the task with nodes executing in parallel.

2. The system of claim 1, wherein the task includes a task of a software application, and wherein the first performance measurement and the second performance measurement include measurements of elapsed times used to process a fixed amount of data of the software application using the first number of nodes and the second number of nodes, respectively.

3. The system of claim 1, further comprising an adjustment manager configured to determine and execute an adjustment from the first number of nodes to the second number of nodes after the determination of the first performance measurement, including determining a fixed number of nodes and determining whether to increase or decrease the first number of nodes by the fixed number of nodes to obtain the second number of nodes.

4. The system of claim 3, wherein the adjustment manager is configured to determine whether to increase or decrease the first number of nodes based on a difference between the first performance measurement and the second performance measurement.

5. The system of claim 1, wherein the calibrator is configured to:
   determine a first overhead factor based on the first performance measurement and the second performance measurement,
   receive at least a third performance measurement of the executing task, while the task is being executed by a third number of nodes operating in parallel,
   determine a second overhead factor using the third performance measurement and at least one other performance measurement, and
   determine the overhead factor as an average value of the first overhead factor and the second overhead factor.

6. The system of claim 1, wherein the overhead function O(n) is represented as $\alpha n$, and the calibrator is configured to calculate the overhead factor as including the term $\alpha$ as representing a linear rate of change of the parallelism overhead of executing the task with nodes executing in parallel.

7. The system of claim 6, wherein the calibrator is configured to determine the overhead factor including the term $\alpha$ by comparing the reduction function evaluated with the first and second number of nodes relative to a performance change between the first and second performance, according to an equationm $f(N_{second})-f(N_{first})=(P_{second}-P_{first})/T$, where $P_{first}$ and $P_{second}$ performance measurements, respectively, and where T represents a time of execution using a single node.

8. The system of claim 1, wherein the calibrator is configured to determine whether to increase or decrease the second number of nodes by an end of a current sampling-then-calibrating operation, the system further comprising:
   a calibrating duration controller configured to control a time interval between the current sampling-then-calibrating operation and a subsequent sampling-then-calibrating operation.

9. The system of claim 8, wherein the calibrating duration controller is configured to:
   determine an optimal number of nodes; and
   determine the time interval based on a change in the optimal number of nodes of the current sampling-then-calibrating operation and at least one previously-determined optimal number of nodes of at least one previous sampling-then-calibrating operation.

10. The system of claim 8, wherein the calibrating duration controller is configured to determine the time interval based on a previous time interval between the current sampling-then-calibrating operation and a previous sampling-then-calibrating operation.

11. The system of claim 1 wherein the calibrator is configured to instruct a resource scheduler to assign an optimal number of nodes for execution of the task therewith.

12. A computer-implemented method comprising:
   determining a first performance measurement of an executing task, while the task is executed by a first number of nodes operating in parallel;
   determining a second performance measurement of the executing task, while the task is being executed by a second number of nodes operating in parallel;
   comparing the first performance to the second performance; and
   calculating an overhead factor as characterizing an overhead function O(n) within a reduction function f(n)=(1/n)+O(n), where n represents a number of nodes and where the reduction function characterizes a change of parallelism overhead of executing the task with nodes executing in parallel.

13. The method of claim 12 wherein determining the first performance measurement comprises:
   executing an adjustment from the first number of nodes to the second number of nodes after the determining of the first performance measurement, including determining a fixed number of nodes and determining whether to increase or decrease the first number of nodes by the fixed number of nodes to obtain the second number of nodes.

14. The method of claim 12, further comprising:

determining an optimal number of nodes associated with an end of a current sampling-then-calibrating operation; and controlling a time interval between the current sampling-then-calibrating operation and a subsequent sampling-then-calibrating operation, based on a change in the optimal number of nodes of the current sampling-then-calibrating operation and at least one previously-determined optimal number of nodes of at least one previous sampling-then-calibrating operation, and further based on a previous time interval between the current sampling-then-calibrating operation and a most-recent previous sampling-then-calibrating operation.

15. A non-transitory computer-readable medium comprising instructions that, when executed, are configured to cause a computing system to:

determine a first performance measurement of an executing task, while the task is executed by a first number of nodes operating in parallel;

determine a second performance measurement of the executing task, while the task is being executed by a second number of nodes operating in parallel;

compare the first performance to the second performance; and calculate an overhead function $O(n)$ within a reduction function $f(n)=(1/n)+O(n)$, where n represents a number of nodes and where the reduction function characterizes a change of parallelism overhead of executing the task with nodes executing in parallel.

16. The non-transitory computer-readable medium of claim 15, wherein the overhead function $O(n)$ is represented as $\alpha n$, and an overhead factor is calculated as including the term $\alpha$ as representing a linear rate of change of the parallelism overhead of executing the task with nodes executing in parallel.

17. The non-transitory computer-readable medium of claim 15, wherein the instructions are further configured to cause the computing system to determine an optimal number of nodes in association with an end of a current sampling-then-calibrating operation, and wherein a time interval between the current sampling-then-calibrating operation and a subsequent sampling-then-calibrating operation is determined based on an extent to which the optimal number of nodes of the current sampling-then-calibrating operation is different from a previously-determined optimal number of nodes of a previous sampling-then-calibrating operation.

18. The system of claim 1, further comprising an adjustment manager configured to determine whether to increase or decrease the second number of nodes for executing the task based on the comparing.

19. The method of claim 12, further comprising determining whether to increase or decrease the second number of nodes for executing the task based on the comparing.

20. The non-transitory computer-readable medium of claim 15, wherein the instructions are further configured to cause the computing system to determine whether to increase or decrease the second number of nodes for executing the task based on the comparing.

* * * * *